Sept. 9, 1924.
R. H. HASSLER
1,508,097
SHOCK ABSORBER CONNECTING ROD
Filed Oct. 16, 1922    2 Sheets—Sheet 1
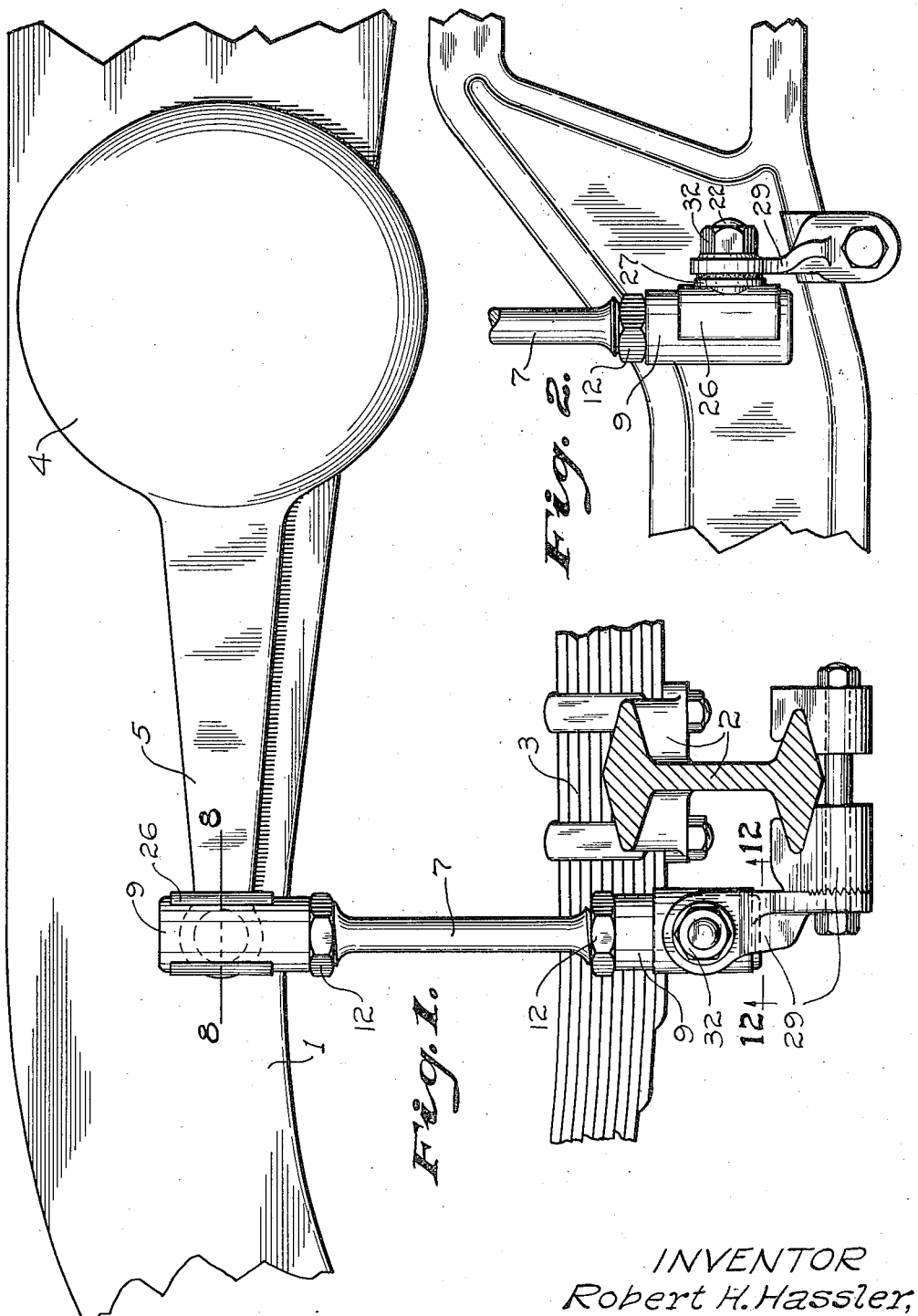
INVENTOR
Robert H. Hassler,
By Raymond F. Buckley,
ATTORNEY Sept. 9, 1924.
R. H. HASSLER
SHOCK ABSORBER CONNECTING ROD
Filed Oct. 16, 1922        2 Sheets—Sheet 2
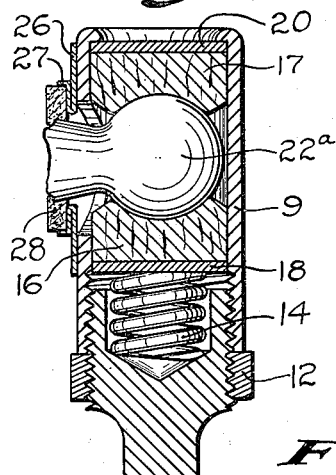
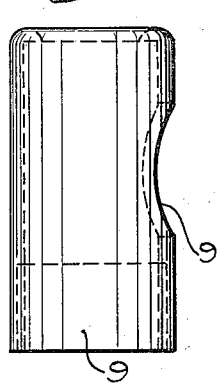
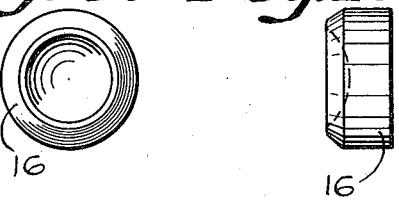
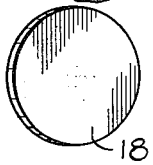
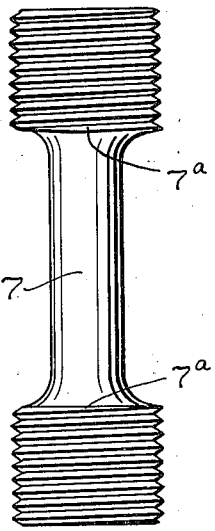
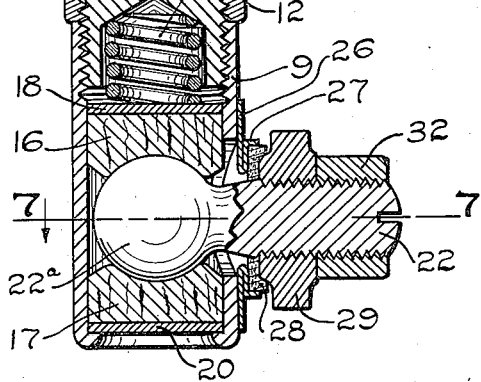
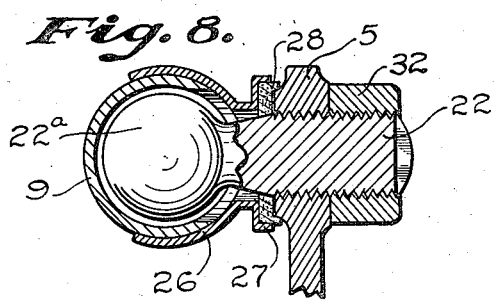
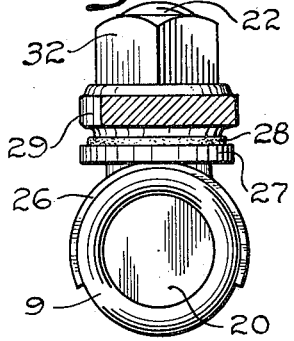
INVENTOR
Robert H. Hassler,
By Raymond F. Buckley,
ATTORNEY Patented Sept. 9, 1924.

1,508,097

UNITED STATES PATENT OFFICE.

ROBERT H. HASSLER, OF INDIANAPOLIS, INDIANA.

SHOCK-ABSORBER CONNECTING ROD.

Application filed October 16, 1922. Serial No. 594,921.

*To all whom it may concern:*

Be it known that I, ROBERT H. HASSLER, a citizen of the United States, residing at Indianapolis, in the county of Marion and State of Indiana, have invented certain new and useful Improvements in Shock-Absorber Connecting Rods, of which the following is a specification.

My invention relates to connecting rods for use as a part of a shock absorbing mechanism of motor vehicles, and more particularly to the flexible ball and socket type. The objects of the invention are to provide a connecting rod that is simple in design, cheap to manufacture, and easy to assemble and disassemble.

A further object of the invention is to provide a connecting rod with adjustable means for attaching it to the vehicle, to accommodate the numerous angles required for connecting shock absorbers to operate efficiently.

A still further object of the invention is to provide a flexible connecting rod which transmits a reciprocative movement longitudinal with its axis, through interposed springs, the springs having a higher compressive strength than that required to exert the normal load pressure.

Another object of the invention is to provide a construction which will automatically take up any wear which occurs to the ball and socket joints.

Still another object is to provide sockets which are self-lubricating in order to eliminate the use of hard greases generally used in lubricating ball and socket joints.

With these and incidental objects in view, the invention consists in the novel combination of parts, a preferred form of embodiment of which is shown in the accompanying drawings forming a part of this specification.

Referring to the drawings, Figure 1 is a side elevation showing a fragment of a vehicle chassis, illustrating the flexible connecting rod operatively connected to the actuator arm of a well known type of friction shock absorber, and to the vehicle axle element. Fig. 2 is a fragmentary front elevation of the vehicle axle illustrating the lower end of the connecting rod attached thereto. Fig. 3 is a longitudinal sectional view of the assembled connecting rod. Fig. 4 is a side elevation of one of the sleeves. Fig. 5 is a perspective view of one of the circular disks. Fig. 6 is an end elevation of the sleeve shown in Fig. 7. Fig. 7 is an elevation of one of the sleeves, and shows more clearly the aperture which is common to both the top and bottom sleeves. Fig. 8 is a cross section of the assembled connecting rod and taken on the line 8—8 in Fig. 1. Fig. 9 is a plan view of one of the sockets, and Fig. 10 is a side elevation thereof. Fig. 11 is an elevation of the center member or connecting rod. Fig. 12 is an end elevation of the assembled connecting rod, and taken on the line 12—12 in Fig. 1.

Referring to the annexed drawings in which the same parts are indicated by the same ordinals in the several views, 1 represents a vehicle frame, 2 a vehicle axle, and 3 represents a semi-elliptic spring mounted on the vehicle axle, which has its free ends connected to the frame member in the usual manner.

I have shown mounted on the frame member 1 a well known type of friction shock absorber 4 which employs circular friction disks not shown, for dissipating vibrations of the axle and frame elements, which are caused from rough and uneven roads. 5 is the shock absorber actuator arm integrally connected thereto which oscillates the friction mechanism in response to vibrations of the axle, when operatively connected.

I have indicated by the ordinal 7 the center member or connecting rod within enlarged hollow end portions 7ª—7ª. These ends are provided with external screw-threads which cooperate with the sleeves 9—9 which are provided with internal screw-threads, and adapted to engage those threads on the ends of rod 7. This engagement, in combination with related members, effects a swivel or revolving adjustment for positioning the attaching members when being attached to the vehicle. This position is secured by means of the lock nuts 12—12. The hollow portions 7ª—7ª of the rod provide abutments as well as housings which contain the compression springs 14—14. Pressure is imparted by the springs to each of the inner sockets 16—16, the sockets being provided with spherical bearings. 17—17 represent outer sockets and are constructed identical with the sockets 16—16. 18—18 represent circular disks which are interposed between the ends of the compression springs 14—14 and the flat annular surface of the sockets 16—16, which form protecting covers for the sockets to prevent mechanical damage from the spring ends. The outer sockets are protected by means of similar circular disks 20—20 which fit into the ends of sleeves 9—9. The sockets may follow any of the well known types of construction and manner of arrangement without departing from the spirit of my invention, but are preferably made of impregnated wood which renders the spherical bearing or seat self-lubricating. Within the spherical bearing surfaces of sockets 16—16 are journaled the balls 22$^a$—22$^a$ which form a part of the connecting studs 22—22.

The sleeves 9—9 are provided with aperture 9$^a$—9$^a$ formed in the walls thereof and adapted to accommodate the insertion of the balls 22$^a$—22$^a$. These apertures are substantially the same diameter as the ball portions, and after the balls are inserted in place, they afford a clearance or working space for the free movement of the neck or stud 22. To maintain a closure for this opening which will permit the free movement of the ball stud and still prevent the entrance of road dirt and other foreign matters, I have provided covers which will now be particularly described: These covers consist of normally resilient plates 26—26 of semi-cylindrical form which may be either metal stampings or made by any convenient process. They are formed with center apertures to permit the insertion of the studs 22 and with circular cup portions 27 preferably formed integrally therewith for the purpose of maintaining circular packing felts 28 which fit snugly around the studs as well as in the cup portions 27. They are pressed firmly into engagement in the cups by means of the adjacent connecting parts. 29 on the lower end of the rod in Fig. 3, represents an axle bracket which is screw-threaded to cooperate with screw-threads on its respective ball stud 22 which effects means for forcing the felt tightly in the cup. This permits a free movement of the ball stud as the cover is free to slide on the sleeve 9, if the compression of the felt does not give a sufficient range of travel. The end of the actuator arm is secured to its respective ball stud in the same manner and functions in relation to the covers in the same manner as the axle bracket just described. The ball stud members 22 when once given a proper adjustment with respect to the felts and other adjacent parts, can be secured by means of the lock nuts 32—32.

With the construction above described, it will be seen that my new connecting rod presents several advantages. The use of self-lubricating sockets dispenses with the task of constantly refilling the pockets with the usual hard greases. The sockets are preferably made of impregnated wood, the impregnation being a lubricant adapted for this kind of service and is of a nature that ordinary road temperatures will not cause the lubricant to liquefy and collect on the outside of the sockets. The usual hard greases and oils used in lubricating such joints must be used in such quantities that the moving parts tend to churn them about, and any road dirt, grit or foreign matters that lodge therein are readily churned about and are carried to the bearing surfaces, thus causing undue wear as well as causing a rapid deterioration of the lubricant. This trouble is entirely eliminated in my self-lubricating sockets, as there is no loose lubricant on the parts to give the above described troubles.

To protect the wearing surfaces of the balls and sockets from loose road dust and dirt that would be ordinarily thrown against the parts due to the open crevice which surrounds the stud 22, the protective cover 26 and felt 28 have been provided which contribute to the value of the self-lubricating sockets, since they provide still further protection.

By exhaustive experiments and observations it has been found that connecting rods employed to operate friction type shock absorbers, produce far more satisfactory results in assisting the friction device to control the vibrations of the movable vehicle parts, if they are of the direct acting type. The general type of flexible connecting rods in use, such as reach rods or steering gear drag links, are provided with shock absorbing springs which have a compressive strength slightly under the mean pressure intended for the proper functioning of the rod, which produces a lost motion equivalent to the amount the spring yields under load pressure. This lost motion is very undesirable in shock absorber connecting rods, as the vibrations of the vehicle springs are more easily controlled if the dampening effect is applied immediately at the beginning of each movement or vibration.

I have provided a construction where the movement is imparted by the rod through interposed springs which have a greater compressive strength than the mean working load of the rod, which for practical purposes could be considered a solid connecting rod, but still the yielding qualities of the springs are utilized for taking up any wear that occurs to the bearing surfaces of either the balls or sockets.

The novel form of mounting the sleeve 9—9 on the connecting rod 5, provides a form of rod which can be readily adjusted to accommodate any angles required for attaching the studs 22 to various parts of vehicles.

Obviously, changes in the details of construction may be made without departing from the spirit of the invention and I do not care to limit myself to any particular form or arrangement of parts.

Having thus fully described my invention, what I claim is:—

1. A shock absorber connecting rod comprising a center rod having threaded end portions engaging threaded thimble members, said thimble members forming housings for ball joints of which the ball members are adapted to be secured to a vehicle frame and axle respectively, and means for locking said thimbles in their respective operative positions.

2. A shock absorber connecting rod as defined in claim 1, in which the ends of the center rod are recessed to provide seats for compression springs and the outer ends of the thimble members are provided with internal integral abutments for opposing the action of said springs.

In witness whereof I have hereunto set my hand and seal at Indianapolis, Indiana, this 25th day of September, A. D., one thousand nine hundred and twenty-two.

ROBERT H. HASSLER. [L. S.]